(12) United States Patent
Domel et al.

(10) Patent No.: US 9,261,047 B2
(45) Date of Patent: Feb. 16, 2016

(54) JET EXHAUST NOISE REDUCTION

(75) Inventors: Neal D. Domel, Fort Worth, TX (US);
Daniel N. Miller, Bainbridge Island, WA (US)

(73) Assignee: Lockheed Martin Corporation, Bethesda, MD (US)

( * ) Notice: Subject to any disclaimer, the term of this patent is extended or adjusted under 35 U.S.C. 154(b) by 689 days.

(21) Appl. No.: 13/482,131

(22) Filed: May 29, 2012

(65) Prior Publication Data
US 2013/0318944 A1    Dec. 5, 2013

(51) Int. Cl.
*F02K 1/34*    (2006.01)
*F02K 1/38*    (2006.01)

(52) U.S. Cl.
CPC .. *F02K 1/34* (2013.01); *F02K 1/383* (2013.01)

(58) Field of Classification Search
CPC ............. F02K 1/08; F02K 1/383; F02K 1/34
USPC .................................... 181/215, 216; 60/770
See application file for complete search history.

(56) References Cited

U.S. PATENT DOCUMENTS

| | | | | |
|---|---|---|---|---|
| 4,051,671 A | * | 10/1977 | Brewer | 60/262 |
| 4,398,667 A | * | 8/1983 | Maestrello | 239/265.17 |
| 4,817,379 A | * | 4/1989 | Bagley | 60/761 |
| 4,909,346 A | * | 3/1990 | Torkelson | 181/213 |
| 6,178,740 B1 | * | 1/2001 | Su et al. | 60/226.1 |
| 2007/0272477 A1 | * | 11/2007 | Vincent | 181/222 |

FOREIGN PATENT DOCUMENTS

GB          791112       2/1958
JP       2011-112011     6/2011

OTHER PUBLICATIONS

Bruce A. Anderson et al., Noise Reduction by Interaction of Flexible Filaments With an Underexpanded Supersonic Jet, 1999, published by the American Institute of Aeronautics and Astronautics.
Thomas Castelain et al., Noise Reduction of a Mach 0.7-0.9 Jet by Impinging Microjets, 2006, pp. 98-104, published by Elsevier SAS.
Dimitri Papamoschou, Pylon-Based Jet Noise Suppressors, 2008, AIAA Journal, 2008, vol. 47, No. 6.

* cited by examiner

*Primary Examiner* — Jeremy Luks
(74) *Attorney, Agent, or Firm* — Reising Ethington P.C.

(57) ABSTRACT

Reducing jet noise by weakening Mach cones in a jet exhaust gas streamtube. The Mach cones are weakened by modifying exhaust gas flow in a longitudinal axial core of the exhaust gas streamtube.

19 Claims, 7 Drawing Sheets

JET EXHAUST NOISE REDUCTION

CROSS-REFERENCES TO RELATED APPLICATIONS

Not Applicable

STATEMENT REGARDING FEDERALLY SPONSORED RESEARCH OR DEVELOPMENT

Not Applicable

BACKGROUND

1. Field

This application relates generally to a method and device for reducing noise generated by supersonic jet exhaust.

2. Description of Related Art Including Information Disclosed Under 37 CFR 1.97 and 1.98

A supersonic jet exhaust nozzle generally includes an upstream converging section and a downstream diverging section. The converging section expands and accelerates subsonic exhaust gas flow such that the exhaust gas flow reaches the speed of sound at a location of minimum cross-sectional area known as the geometric throat of the nozzle. The diverging section of the nozzle, which begins downstream from the throat, further expands and accelerates the exhaust gas flow to supersonic speeds.

A difference in pressure between an ambient air mass and supersonic exhaust gases departing the nozzle at a nozzle exit, causes cone-shaped waves of compression and expansion, or "Mach cones," to form in an exhaust plume formed downstream from the nozzle exit. The Mach cones are formed as the plume undergoes pressure equalization with the ambient air. Mach cones created in the jet exhaust are propagated downstream along the jet exhaust plume. The Mach cones include shock waves, which generate a significant amount of noise as they impinge upon the shear layer between the exhaust plume and the ambient air.

The amount of noise generated by a jet engine's exhaust plume may, therefore, vary according to (among other factors) an expansion state of an engine's exhaust nozzle, which governs the exhaust plume's pressure relative to that of the ambient air mass. A jet engine exhaust nozzle may have an ideally expanded, under-expanded, or over-expanded state. An under-expanded nozzle is a nozzle shaped such that jet engine exhaust gas pressure at a nozzle exit plane is higher than ambient atmospheric pressure. In contrast, an over-expanded nozzle is a nozzle shaped such that jet engine exhaust gas pressure at the nozzle exit plane is lower than ambient atmospheric pressure. A perfectly or ideally expanded nozzle is a nozzle shaped in such a way that jet engine exhaust gas pressure at the nozzle exit plane equals ambient atmospheric pressure, thereby precluding the formation of Mach cones.

SUMMARY

A method is provided for reducing jet noise by weakening Mach cones in a jet exhaust gas streamtube. The Mach cones are weakened by modifying exhaust gas flow in a longitudinal axial core of the exhaust gas streamtube.

Also provided is jet noise reduction device comprising a gas flow modifier, at least a portion of which is deployable along a central longitudinal axis of a jet exhaust nozzle. The gas flow modifier is configured to weaken jet exhaust streamtube Mach cones by modifying gas flow along a longitudinal axial core of the jet exhaust gas streamtube.

DRAWING DESCRIPTIONS

These and other features and advantages will become apparent to those skilled in the art in connection with the following detailed description and drawings of one or more embodiments of the invention, in which.

DETAILED DESCRIPTION

Figure 3:
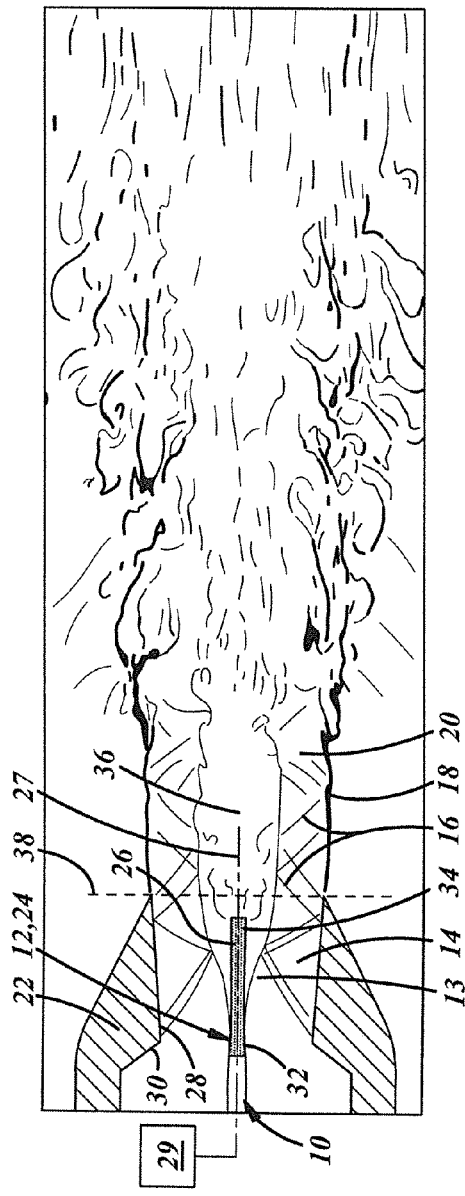
FIG. 3 is a schematic cross-sectional side view of an illustrative embodiment of a jet exhaust noise reduction device in the form of a virtual plug comprising a porous tube emitting pressurized air into the diverging section of a nozzle along a longitudinal axial core of the exhaust gas stream.
Figure 4:
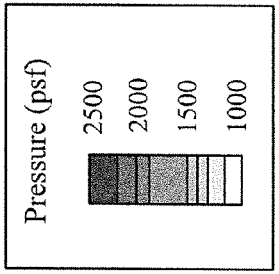
FIG. 4 is a pressure gradient map of the jet exhaust gas stream and nozzle of FIG. 3.
Figure 4:
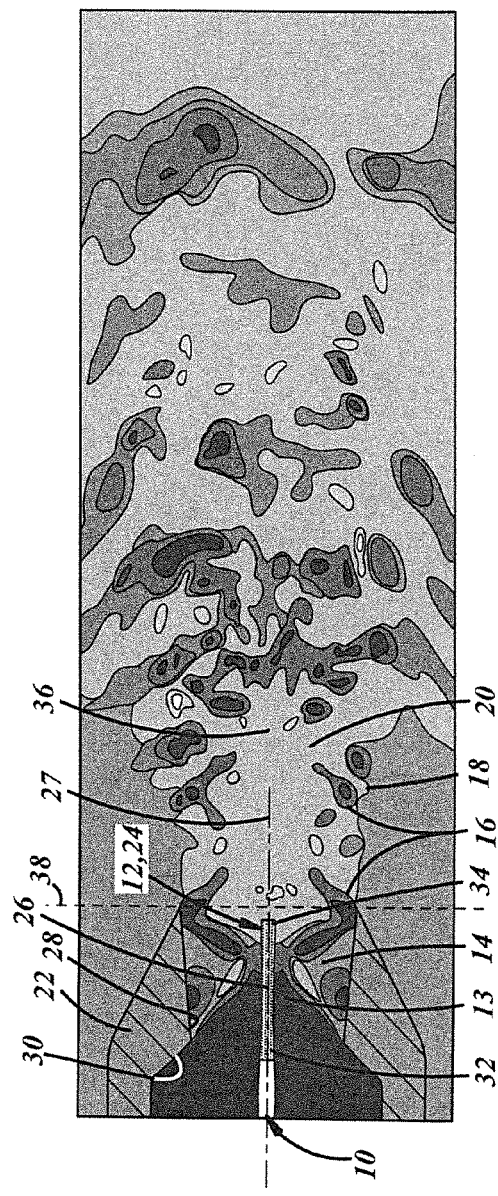

Generally indicated at 10 in FIGS. 3 and 4 is a device that reduces supersonic noise generated when Mach cone shock waves in a jet exhaust plume impinge upon a shear layer surrounding the exhaust plume. A second embodiment is generally indicated at 10' in FIGS. 5, 6, and 10-14, and a third embodiment is generally indicated at 10" in FIGS. 7-9. Reference numerals with the designation prime (') or double prime (") indicate alternative configurations of elements that also appear in other embodiments. Unless indicated otherwise, where a portion of the following description uses a reference numeral to refer to FIGS. 3 and 4, that portion of the description applies equally to elements designated by primed or double primed numerals in other Figures.

According to the first embodiment, the device 10 may include a gas flow modifier 12 that may be disposed in a longitudinal axial core region 13 of a jet exhaust gas streamtube 14. As shown in FIGS. 3 and 4, the gas flow modifier 12 may be positioned and configured to modify gas flow along the longitudinal axial core region 13 of the streamtube 14 in such a way as to weaken Mach cones 16 that are formed in a supersonic portion of the exhaust gas streamtube 14 as shown in FIGS. 1-4. Weakening of the Mach cones 16 reduces the amount of noise generated by the Mach cones 16 as they impinge upon an exhaust plume shear layer 18 surrounding an exhaust plume 20.

Figure 1:
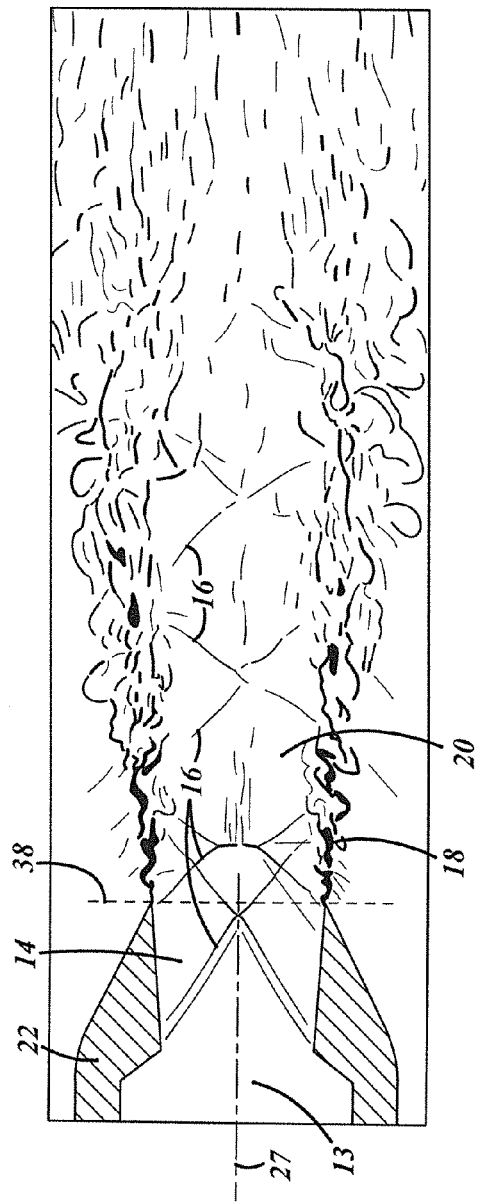
FIG. 1 is a schematic cross-sectional side view of a jet exhaust gas stream exiting a jet exhaust nozzle and forming an exhaust plume and showing Mach cones being generated in a diverging, supersonic section of the nozzle and propagating downstream in the exhaust plume.
Figure 2:
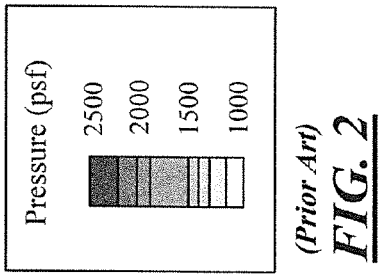
FIG. 2 is a pressure gradient map of the jet exhaust gas stream and nozzle of FIG. 1.
Figure 2:
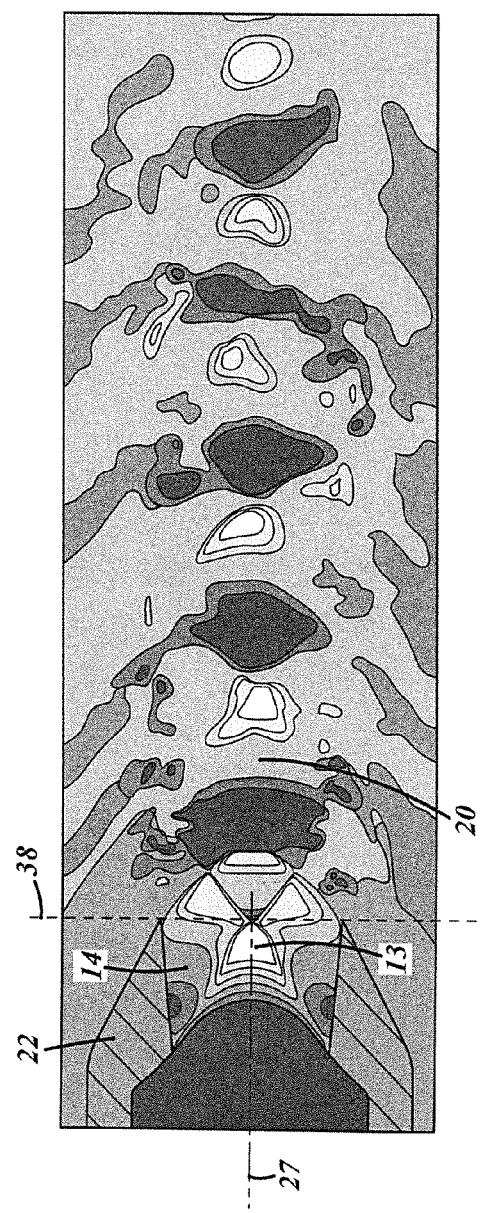

The term "exhaust gas streamtube" herein refers to a flow of exhaust gas through a jet exhaust nozzle 22 and into an exhaust plume 20 formed where streamtube exhaust gases exit the nozzle 22. FIGS. 1 and 2 show baseline visual and a pressure images, respectively, of such an exhaust gas streamtube 14 exiting a jet exhaust nozzle 22 with no gas flow modifier 12 present.

The exhaust gas flow modifier 12 may include a transpiration element 24 that may be deployed along a central longitudinal axis 27 of the jet exhaust nozzle 22 such that the element 24 passes through at least respective portions of both converging 30 and diverging 28 sections of the nozzle 22. The transpiration element 24 may be configured to passively absorb exhaust gas from the streamtube 14 where the streamtube 14 passes through the relatively high-pressure converging section 30 of the nozzle 22 and may be further configured to expel the absorbed exhaust gas back into the streamtube 14 where the streamtube 14 passes through the relatively low-pressure diverging section 28 of the nozzle 22.

The transpiration element 24 may comprise a flexible porous tube 26 that may absorb exhaust gas from the streamtube 14 through upstream pores 32 in the nozzle's converging section 30 and expel the absorbed exhaust gas back into the streamtube 14 via downstream pores 34 in the nozzle's diverging section 28. Alternatively, low energy air could be routed into the tube 26 from another low energy air source 29 and forced through the downstream pores 34 of the porous tube 26. According to this alternative arrangement there would be no need for upstream pores 32 in the flexible porous tube 26.

In either case, the flexible porous tube 26 may thus act as a "virtual plug" by expelling exhaust gas out of downstream pores 34 in such a way as to form a low energy wake 36 (In other words, having lower stagnation pressure than the surrounding exhaust plume 20) that displaces an axial core of the exhaust gas streamtube 14 such that the exhaust gas streamtube 14 becomes annular in shape where the exhaust gas streamtube 14 crosses an exit plane 38 of the exhaust nozzle 22. Where the exhaust nozzle 22 is over-expanded, the tube 26 may be configured to expel air from its downstream pores 34 in such a way as to form a wake 36 that forms the exhaust gas streamtube 14 into an annular cross-sectional shape having, at the nozzle exit plane 38, a lowered effective cross-sectional exit area that approaches an ideal expansion state, i.e., a cross-sectional exit area close enough to an ideal expansion state to weaken Mach cones sufficiently to effect a noise level reduction of a desired magnitude. The flexible porous tube 26 may comprise Sylramic™ SiC Fiber or any other suitable flexible material capable of withstanding high temperatures. Alternatively, the tube 26 may comprise any suitable non-flexible heat-resistant material formed in interconnected segments that allow the tube to flex.

Figure 5:
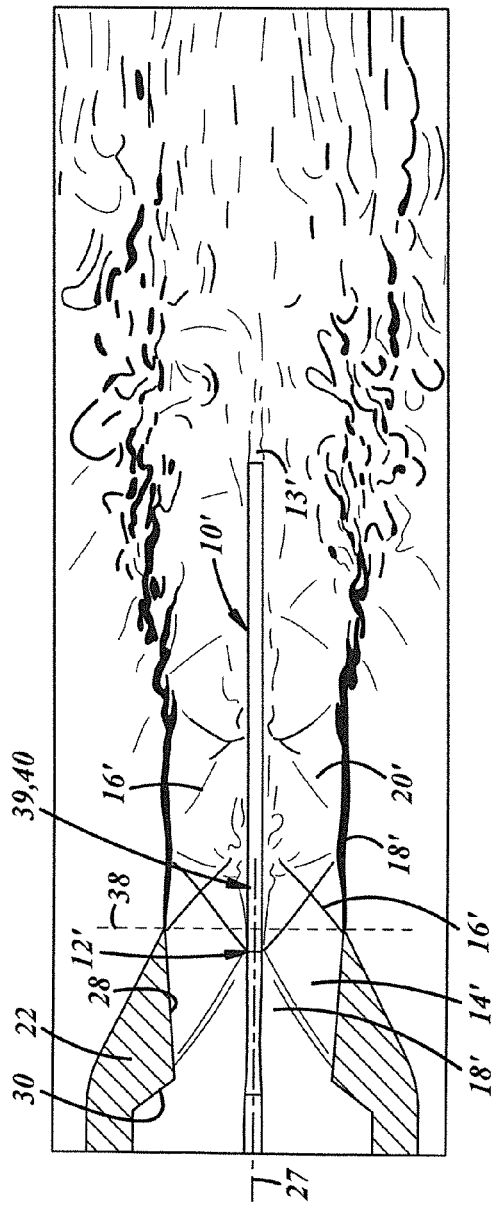
FIG. 5 is a schematic cross-sectional side view of another illustrative embodiment of a jet exhaust noise reduction device in the form of a porous tube transpiration element deployed along a longitudinal axial core of a jet exhaust gas stream.
Figure 6:
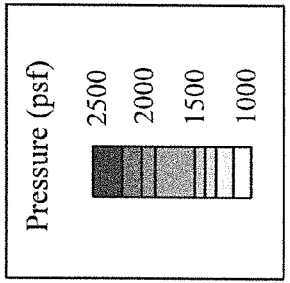
FIG. 6 is a pressure gradient map of the jet exhaust gas stream and nozzle of FIG. 5.
Figure 6:
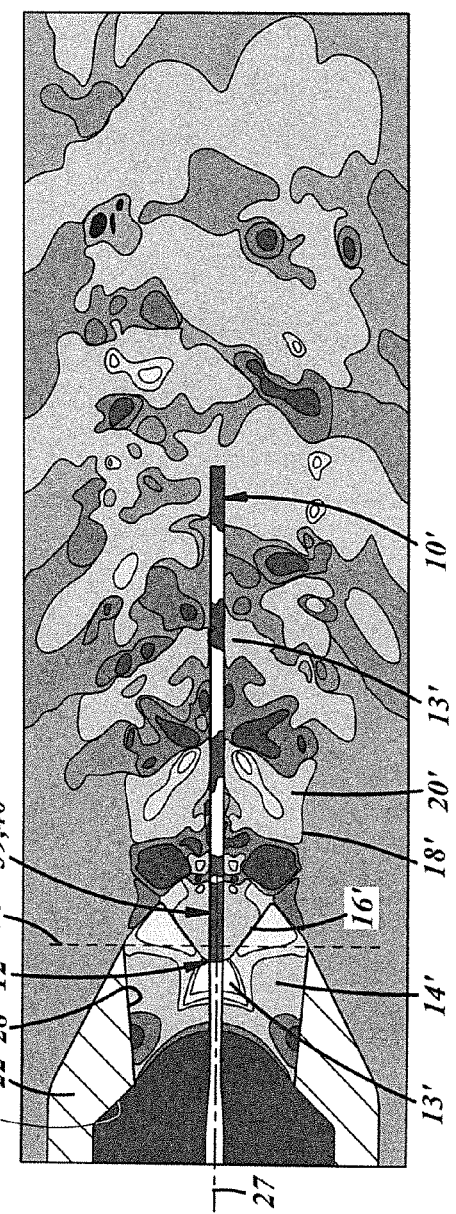

According to the second embodiment, and as shown in FIGS. 5 and 6, an exhaust gas flow modifier 12' may alternatively include a Mach cone silencer 39 comprising a longer transpiration element 40 (i.e., a transpiration element 40 longer than the transpiration element 24 of the first embodiment) that is deployable along a longitudinal axial core 13' of an exhaust gas streamtube 14'. Where the relatively short transpiration element 24 of the first embodiment transpires gas only within the nozzle, the long transpiration element 40 may be configured to extend through and past the nozzle exit plane 38 to passively weaken Mach cones 16' in the exhaust plume 20' by reducing pressure differentials across (i.e., between opposite sides of) Mach cone shock waves 16. The reduced pressure differentials cause a corresponding reduction in magnitude of the impingement of the exhaust plume Mach cones 16 on the shear layer 18 surrounding the jet exhaust plume 20'. In other words, the long transpiration element 40 may passively absorb and expel gas in a way that mimics a wavy rod configured to weaken the reflected strength of any incident wave (compression or expansion), thereby weakening the exhaust plume Mach cones 16'. This embodiment may be employed to reduce noise in either under-expanded or over-expanded jet plumes.

Figure 10:
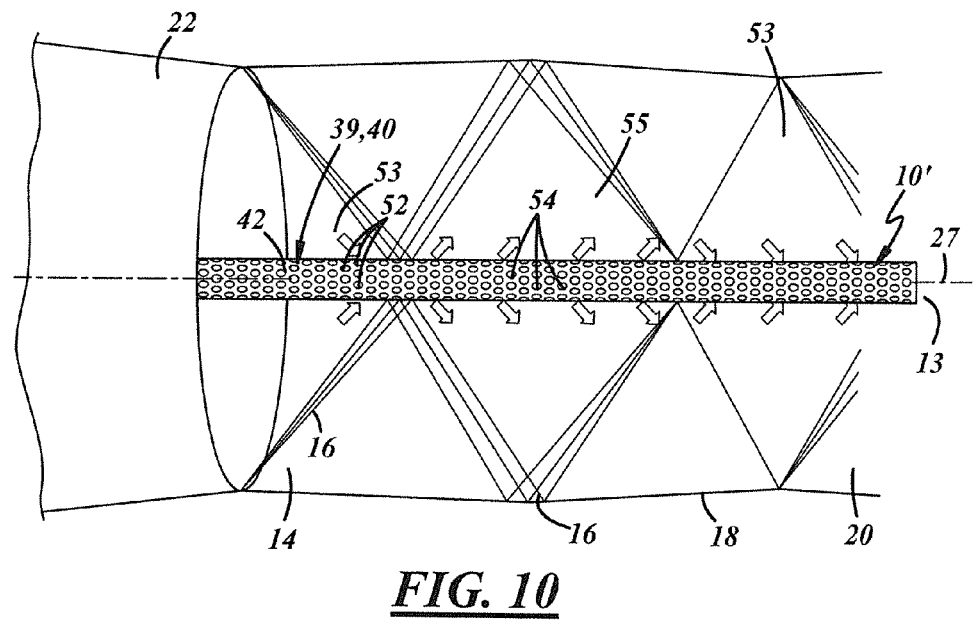
FIG. 10 is a schematic magnified view depicting interaction between the jet exhaust gas stream of FIG. 5 and transpiration flow into and out of the porous tube of FIG. 5.
Figure 11:
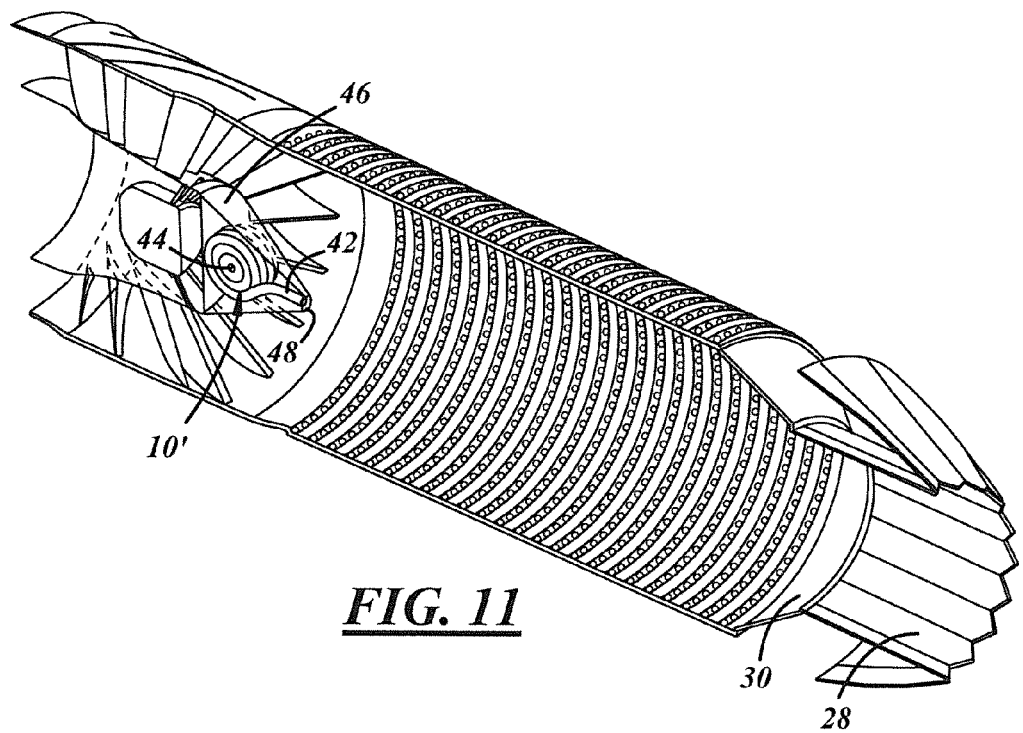
FIG. 11 is a cutaway view of the jet exhaust noise reduction device of FIG. 5 installed in a turbine hub cone of a jet engine at an upstream end of an exhaust nozzle of the engine and shown with the porous tube transpiration element retracted onto a reel of the device within the turbine hub.
Figure 12:
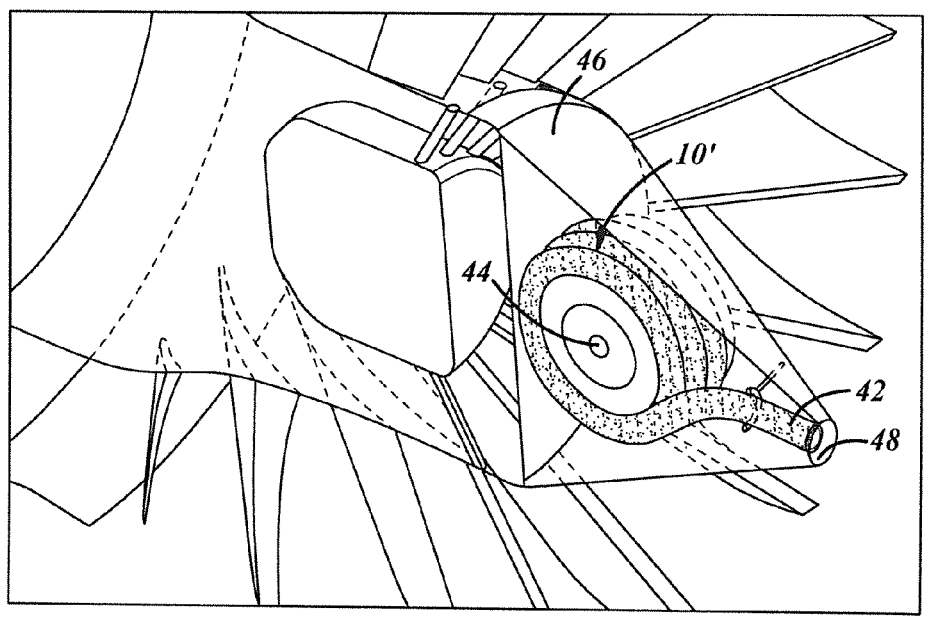
FIG. 12 is a magnified cutaway view of the retracted porous tube transpiration element of FIG. 11.
Figure 13:
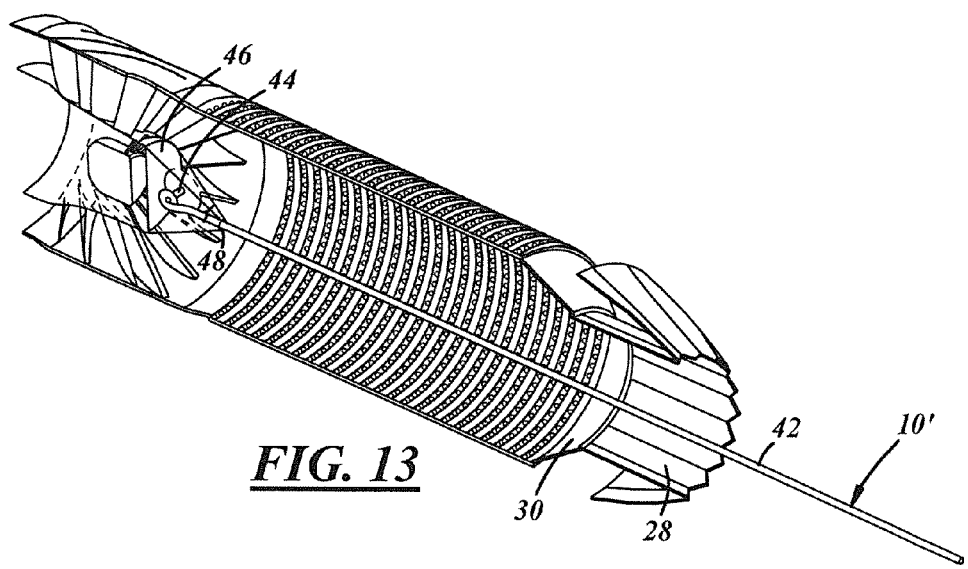
FIG. 13 is a cutaway view of the jet engine exhaust noise reduction device of FIGS. 5, 11, and 12 shown with the porous tube transpiration element deployed from the reel through an opening in an apex of the turbine hub cone.
Figure 14:
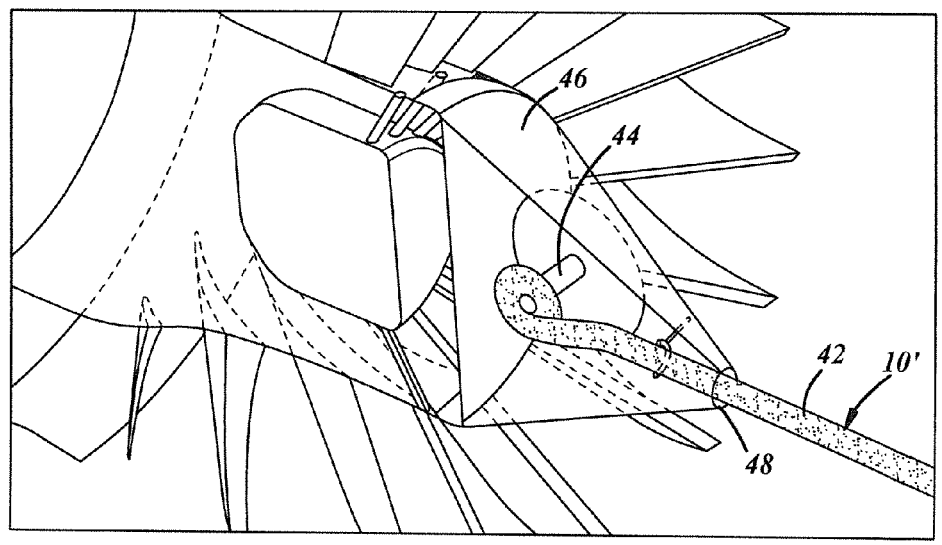
FIG. 14 is a magnified cutaway view of the deployed porous tube transpiration element of FIG. 13.

As best shown in FIG. 10, the long transpiration element 40 may comprise a long flexible porous tube 42 (i.e., a flexible porous tube 42 longer than the flexible porous tube 26 of the first embodiment) deployable along the longitudinal axial core 13' of the exhaust gas streamtube 14'. Where the long transpiration element 40 is a long porous tube 42, plume exhaust gases may be drawn into the long porous tube 42 through tube pores 52 disposed in relatively high pressure portions 53 of Mach cone shock waves 16'. The gases may be exhausted from the long porous tube through tube pores 54 disposed in relatively low pressure portions 55 of Mach cone shock waves 16'. As shown in FIGS. 11-14, the device 10' may include a reel 44 that may be disposed in an engine turbine hub cone 46 and may be configured to deploy and retract the long porous tube 42 through an opening 48 at an apex of the turbine hub cone 46. As best shown in FIGS. 5, 6, and 13, the device 10' may be configured to deploy the porous tube 42 to preferably extend approximately 3 (between 2.5 and 4) nozzle diameters aft of the nozzle exit plane 38.

Figure 7:
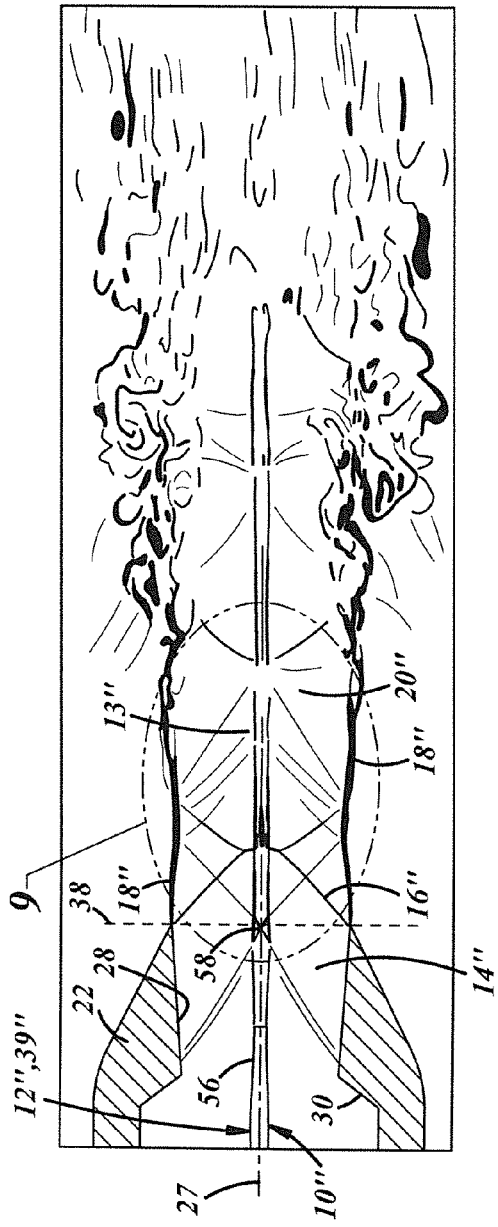
FIG. 7 is a schematic cross-sectional side view of an additional illustrative embodiment of a jet exhaust noise reduction device in the form of a secondary subjet disposed in a diverging section of a jet exhaust nozzle and directing a high energy flow of gas along a centerline of an exhaust gas plume.
Figure 8:
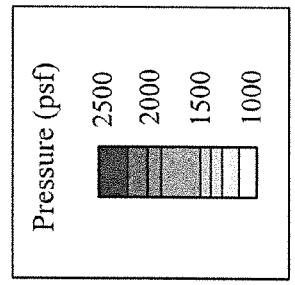
FIG. 8 is a pressure gradient map of the jet exhaust gas stream and nozzle of FIG. 7.
Figure 8:
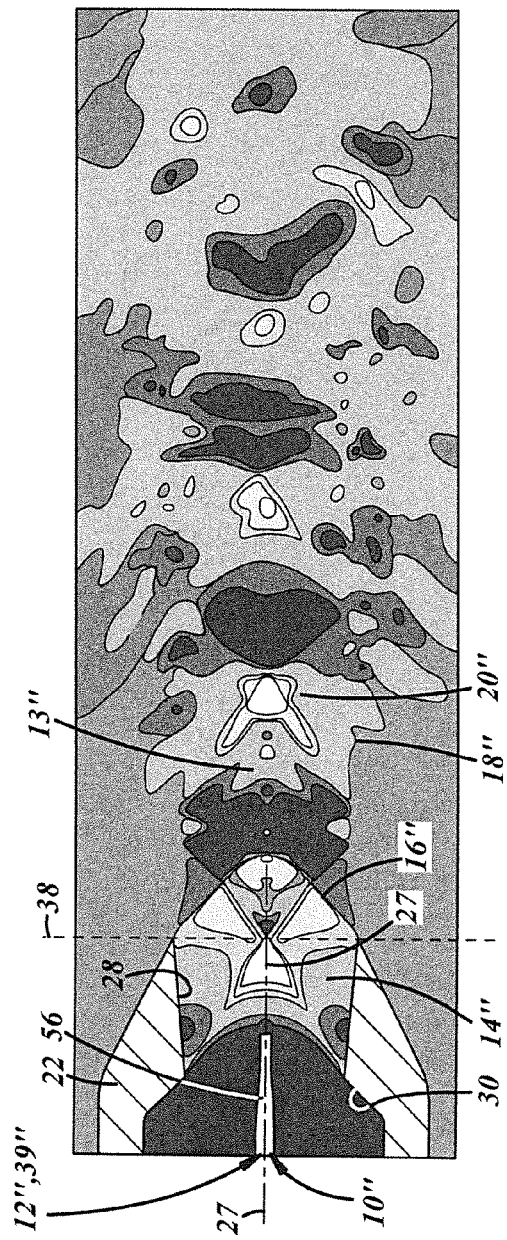
Figure 9:
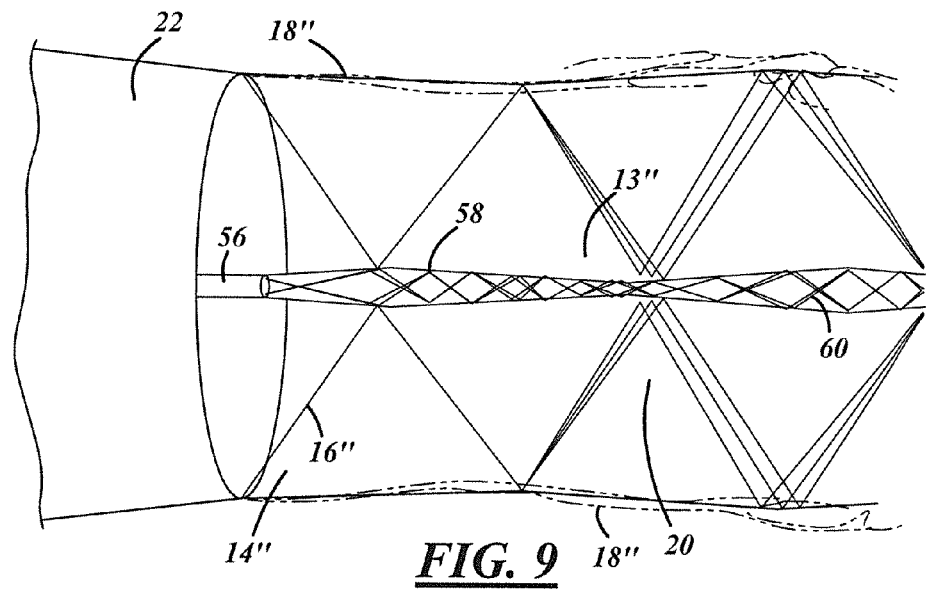
FIG. 9 is a schematic magnified view of region 9 of FIG. 7 depicting interaction between the jet exhaust gas stream and the high energy flow from the secondary subjet.

According to the third embodiment, and as shown in FIGS. 7-9, the exhaust gas flow modifier 12" may include a Mach cone silencer 39" in the form of a secondary subjet 56 rather than a porous tube. The secondary subjet 56 may be configured and positioned to emit a high-energy (stagnation pressure greater than the surrounding exhaust plume 20") supersonic secondary gas plume 58 into a diverging section 28 of the jet exhaust nozzle 22 along the longitudinal axial core 13" of the exhaust gas streamtube 14". As best shown in FIG. 9, secondary Mach cones 60 formed in the secondary gas plume 58 weaken the Mach cones 16" of the surrounding (primary) exhaust plume 20" and reduce noise due to impingement of the primary plume's Mach cones 16" on the shear layer 18" surrounding the primary plume 20".

In practice, noise generated when Mach cone shock waves 16 in the supersonic flow region of the jet exhaust gas streamtube 14 impinge upon the shear layer 18 surrounding the plume portion of the streamtube 14, may be reduced by modifying exhaust gas flow in the longitudinal axial core region of the exhaust gas streamtube 14 in such a way as to weaken the Mach cones 16.

As shown in FIGS. 1 and 2, exhaust plume Mach cones 16 may be passively weakened or inhibited during formation by deploying a gas flow modifier 12 in the form of a transpiration element 24, such as a flexible porous tube 26, to a position along the central longitudinal axis 27 of the exhaust nozzle 22 through which the exhaust gas is flowing. The transpiration element 24 may extend from a converging (subsonic) section 30 of the exhaust nozzle 22 into a diverging (supersonic) section 28 of the nozzle 22 and may be configured to passively absorb exhaust gases from the streamtube 14 in the converging section 30 of the nozzle 22 and expel the absorbed gasses into the diverging section 28 of the nozzle 22 upstream of the nozzle exit plane 38. The gases may be expelled from the transpiration element 24 such that a low energy wake 36 or "virtual plug" is generated along the longitudinal axial core 13 of the exhaust gas streamtube 14 in the diverging section 28 of the jet exhaust nozzle 22. The low energy wake 36 may be generated such that it displaces the axial core 13 of the exhaust gas streamtube 14, forcing the exhaust gas streamtube 14 into an annular cross-sectional configuration having a lowered effective cross-sectional area that approaches an ideal cross-sectional area for a perfectly expanded state where the exhaust gas streamtube 14 crosses the exit plane 38 of the exhaust nozzle 22.

Alternatively, as shown in FIGS. 5, 6, and 10-14, exhaust plume Mach cones 16' may be passively weakened by deploying a longer transpiration element 40, such as a long flexible porous tube 42 to preferably extend approximately 3 nozzle diameters aft of the nozzle exit plane 38 along the longitudinal axial core 13' of the exhaust gas streamtube 14'. The long transpiration element 40 may be configured to act as a "Mach cone silencer" while deployed, by reducing pressure differentials across Mach cone shock waves 16'. The transpiration element may be deployed while the jet engine is running and a jet exhaust plume 20' is present, and may be retracted before the jet is shut down so that the transpiration element is deployed only when supported by the exhaust gas streamtube 14'.

As a further alternative shown in FIGS. 7-9, exhaust plume Mach cones 16" may be weakened by a Mach Cone Silencer 39" in the form of a subjet 56, rather than a porous tube, disposed in the diverging section 28 of the jet exhaust nozzle 22. The subjet 56 may be positioned and configured to emit a high-energy flow of gas along a longitudinal axial core 13" of the exhaust gas streamtube 14" to form a narrow secondary supersonic plume 58 having subjet Mach cones 60 that weaken the primary exhaust plume Mach cones 16".

A jet noise reduction device constructed and employed as described above greatly reduces noise generated by Mach cone formation in jet exhaust plumes, with negligible impact on an engine's thrust. Among other advantages, an engine equipped with such a device can produce more thrust for a given amount of sound generated, than could the same engine without a sound reduction device. Thus, an aircraft equipped with noise reduction devices retains a better performance envelope than unmodified aircraft in areas with noise reduction restrictions. By using the presently disclosed device/method, engines may also be designed to have a superior performance envelope that would otherwise produce an unacceptable level of noise.

This description, rather than describing limitations of an invention, only illustrates embodiments of the invention described in the claims. The language of this description is therefore exclusively descriptive and is non-limiting. Obviously, it's possible to modify this invention from what the description teaches. Within the scope of the claims, one may practice the invention other than as described above.

What is claimed is:

1. A method for reducing jet noise, the method including weakening Mach cones in a jet exhaust gas streamtube by modifying exhaust gas flow in a longitudinal axial core of the exhaust gas streamtube, the step of modifying exhaust gas flow including passively weakening exhaust plume Mach cones by reducing pressure differentials across Mach cone shock waves, the step of reducing pressure differentials including deploying a transpiration element along the longitudinal axial core of the exhaust gas streamtube.

2. The method of claim 1 in which the step of modifying exhaust gas flow includes generating a low energy wake along the longitudinal axial core of the exhaust gas streamtube in a diverging section of the jet exhaust nozzle such that the low energy wake displaces the axial core of the exhaust gas streamtube, thereby forming the streamtube into an annular configuration.

3. The method of claim 2 in which the step of generating a low energy wake includes forming the exhaust gas streamtube into an annular configuration having, at an exit plane of the nozzle, an effective cross-sectional area that approaches an ideal cross-sectional area for a perfectly expanded state.

4. The method of claim 3 in which the step of generating a low energy wake includes deploying a transpiration element in the exhaust nozzle along a central longitudinal axis of the nozzle in a position passing through at least portions of both converging and diverging sections of the nozzle such that exhaust gas passing through the converging section of the nozzle is absorbed into the transpiration element and is expelled from the transpiration element into the diverging section of the nozzle.

5. The method of claim 4 in which the step of deploying a transpiration element includes deploying a porous tube.

6. The method of claim 5 in which the step of deploying a porous tube includes deploying a flexible porous tube.

7. The method of claim 1 in which the step of deploying a transpiration element includes deploying a porous tube along the longitudinal axial core of the exhaust gas streamtube.

8. The method of claim 7 in which the step of deploying the porous tube includes deploying the tube to extend approximately three nozzle diameters aft of the nozzle exit plane.

9. The method of claim 7 in which the step of deploying a transpiration element includes deploying the transpiration element while the jet exhaust streamtube is present.

10. A jet noise reduction device comprising a gas flow modifier including a transpiration element, at least a portion of the transpiration element being deployable along a central longitudinal axis of a jet exhaust nozzle and configured to passively weaken jet exhaust streamtube Mach cones by modifying gas flow along a longitudinal axial core of the jet exhaust gas streamtube such that pressure differentials are reduced across Mach cone shock waves.

11. A jet noise reduction apparatus as defined in claim 10 in which the exhaust gas flow modifier includes a flexible porous tube deployable along the central longitudinal axis of the jet exhaust nozzle through at least portions of both converging and diverging sections of the nozzle, the porous tube being configured to absorb exhaust gas in the converging section of the nozzle and to expel the absorbed exhaust gas into the diverging section of the nozzle.

12. A jet noise reduction apparatus as defined in claim 11 in which the porous tube includes an array of pores through which the tube expels exhaust gas to form a wake that forms the exhaust gas streamtube into an annular configuration having, at the nozzle exit plane, an effective cross-sectional exit area that approaches an ideal expansion state.

13. A jet noise reduction apparatus as defined in claim 10 in which the transpiration element comprises a flexible porous tube.

14. A jet noise reduction apparatus as defined in claim 13 in which the exhaust gas flow modifier is configured to deploy the porous tube to extend approximately three nozzle diameters aft of the nozzle exit plane.

15. A jet noise reduction apparatus comprising:
- a gas flow modifier including a transpiration element, at least a portion of which is deployable along a longitudinal axial core of a jet exhaust gas streamtube and configured to passively weaken jet exhaust streamtube Mach cones by modifying gas flow along a longitudinal axial core of the jet exhaust gas streamtube such that pressure differentials are reduced across Mach cone shock waves;
- the transpiration element comprises a flexible porous tube; and
- the exhaust gas flow modifier includes a reel supported in an exhaust cone of a jet and configured to alternately deploy and retract the flexible porous tube along the longitudinal axial core of the exhaust gas streamtube produced by the jet.

16. The method of claim 1 in which the step of deploying a transpiration element includes deploying a porous tube.

17. The method of claim 16 in which the step of deploying a porous tube includes deploying a flexible porous tube.

18. The method of claim 1 in which the step of deploying a transpiration element includes deploying a porous tube configured to absorb exhaust gas into the tube through pores disposed adjacent high pressure portions of Mach cone shock waves and to allow the absorbed exhaust gases to escape the tube through pores disposed adjacent relatively low pressure portions of the Mach cone shock waves.

19. A jet noise reduction apparatus as defined in claim 10 in which the exhaust gas flow modifier includes a flexible porous tube deployable along the central longitudinal axis of the jet exhaust nozzle, the porous tube being configured to absorb exhaust gas through pores disposed adjacent high pressure portions of Mach cone shock waves and to allow the absorbed exhaust gases to escape through pores disposed adjacent relatively low pressure portions of the Mach cone shock waves.

* * * * *